(12) United States Patent
Godshaw et al.

(10) Patent No.: US 7,036,519 B2
(45) Date of Patent: May 2, 2006

(54) UMBRELLA AND LEASH FOR PETS

(75) Inventors: Donald E. Godshaw, Evanston, IL (US); Andrezj M. Redzisz, Wheeling, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 271 days.

(21) Appl. No.: 10/704,403

(22) Filed: Nov. 7, 2003

(65) Prior Publication Data

US 2004/0134525 A1 Jul. 15, 2004

Related U.S. Application Data

(60) Provisional application No. 60/453,639, filed on Mar. 11, 2003, provisional application No. 60/432,460, filed on Dec. 11, 2002, provisional application No. 60/430,391, filed on Dec. 3, 2002.

(51) Int. Cl.
*A45B 3/00* (2006.01)
*A01K 27/00* (2006.01)

(52) U.S. Cl. .................. 135/16; 135/20.1; 135/96; 119/795

(58) Field of Classification Search ............... 135/15.1, 135/16, 19, 33.71, 25.4, 90, 96, 20.1; 119/795, 119/769, 850; D3/5–6
See application file for complete search history.

(56) References Cited

U.S. PATENT DOCUMENTS

| | | | | |
|---|---|---|---|---|
| 3,267,905 | A * | 8/1966 | Francis | 119/795 |
| 3,892,251 | A * | 7/1975 | Warfield | 135/15.1 |
| D276,278 | S * | 11/1984 | Curtin | D30/154 |
| 4,546,730 | A * | 10/1985 | Holland | 119/780 |
| D324,117 | S * | 2/1992 | Antoine | D30/144 |
| D361,198 | S * | 8/1995 | Vang | D3/5 |
| 5,441,017 | A * | 8/1995 | Lindsay | 119/795 |
| 5,546,970 | A * | 8/1996 | Amato | 135/16 |
| D390,696 | S * | 2/1998 | Bauman | D3/5 |
| 5,918,611 | A * | 7/1999 | Amato | 135/16 |
| D418,671 | S * | 1/2000 | Tsai | D3/6 |
| 6,223,758 | B1 * | 5/2001 | Feldman | 135/33.2 |

* cited by examiner

*Primary Examiner*—Winnie Yip
(74) *Attorney, Agent, or Firm*—Banner & Witcoff, Ltd.

(57) ABSTRACT

Combination animal leash and umbrella includes a center post with a closeable umbrella cover that fits convexly over the leash attached to the inside of the umbrella. In a preferred embodiment, the extending support post of the umbrella is articulatable.

5 Claims, 4 Drawing Sheets

UMBRELLA AND LEASH FOR PETS

CROSS REFERENCE TO RELATE APPLICATIONS

This is a utility patent application based upon, claiming priority to and incorporating by reference the following provisional applications: "Umbrella and Leash For Pets", Serial No. 60/453,639, filed Mar. 11, 2003; "Animal Leash and Umbrella", Serial No. 60/432,460 filed Dec. 11, 2002; and "Animal Leash and Umbrella", Serial No. 60/430,391, filed Dec. 3, 2002.

BACKGROUND OF THE INVENTION

In a principal aspect the present invention relates to a combination leash and umbrella for pets. Pet owners, especially city dweller pet owners, often find it appropriate, if not necessary, to walk their pets, particularly canine pets, at periodic times throughout a day. Attending to a pet under such circumstances typically requires that the pet be retained on a leash, especially in urban areas. When walking a pet in an urban area, especially if the weather is inclement, typically requires the pet walker to provide some protection or cover for the pet, as well as for the individual that is walking the pet. Individuals, thus, often use an umbrella to protect themselves from the elements, particularly rain and/or snow. However, the size of the umbrella may be inadequate to provide coverage to the pet and the individual tending to the pet. Thus, the pet is often exposed to the elements whereas the individual walking the pet may be covered and protected from the elements.

One solution to this dilemma is to provide an oversized umbrella. This solution is not always entirely satisfactory inasmuch as an oversized umbrella is cumbersome and difficult to handle in certain circumstances and may be affected by sudden gusts of wind and may interfere with other pedestrian traffic. Another type of protection for pets comprises pet coats. These are wraps, which are designed on a customized basis depending upon the size of the pet, to be worn by the pet much as a raincoat would be worn by an individual. Such protective wraps, however, are often difficult to place on the pet and may not provide an appropriate degree of protection in many instances. Consequently, there has remained a need for providing a means to protect a pet, and in particular canine pets, when they are being walked, especially on a leash.

SUMMARY OF THE INVENTION

Briefly, the present invention comprises a combination animal leash and umbrella which enables an individual to walk their pet while providing, at the same time, a modicum of protection for the pet from the elements and simultaneously avoiding interference with other pedestrian traffic, particularly in an urban setting. The combination umbrella and leash includes a handle which is attached to a generally convex shaped umbrella which may be suspended over the pet in the manner of a hood. The support handle may include an articulating joint or hinge to allow adjustment of the hood over the pet. The interior of the umbrella within the hood includes a leash attached thereto which may be affixed to a collar of the pet. The handle for the umbrella may include various handle holding elements to facilitate the utilization of the leash and umbrella hood combination. The fabric which forms the hood, shade or cover of the umbrella may be translucent, transparent, or a combination thereof to facilitate monitoring the activities of the pet.

Thus, it is an object of the invention to provide an improved method and device for protecting and catering to a pet on a leash, in particular, canine pets.

It is a further object of the invention to provide a combination animal leash and umbrella for a pet which is easily adjusted, utilized easily for pets of various size, and which provides significant protection for the pets from the elements while on a leash.

Yet another object of the invention is to provide a combination animal leash and pet which is economical, rugged, easy to use and practical.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 1:
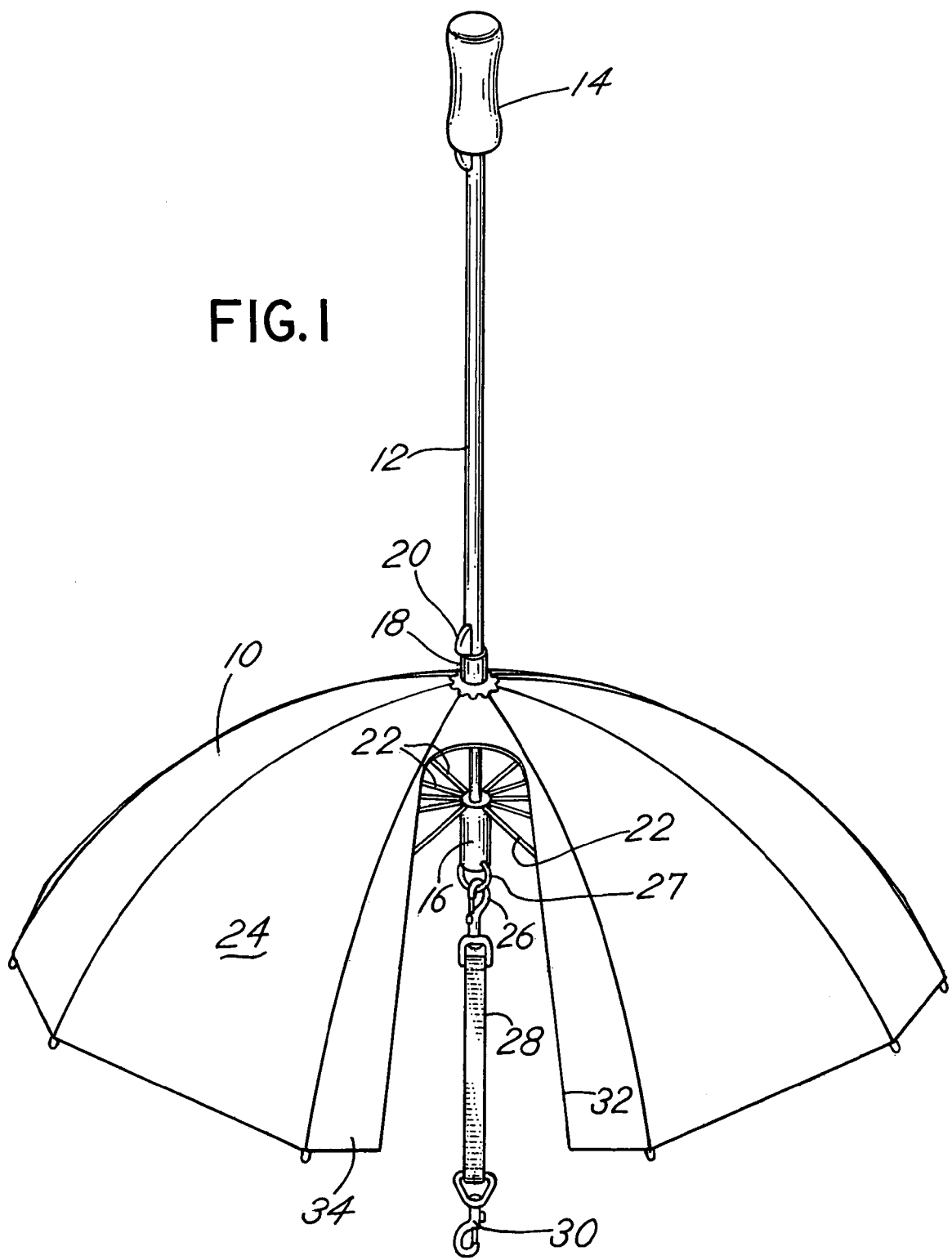
FIG. 1 is an isometric view of a first embodiment of the invention.

A first embodiment of a combination animal leash and umbrella is depicted in FIG. 1. The umbrella comprises a fabric cover 10 attached to foldable support ribs 22 mounted on a center pole 12. The center pole 12 includes an outer end handle 14 and an inner end post 16 at the opposite end from the handle 14. The umbrella hood or cover 10 includes a tubular member or fitting 18 with a center opening. The fitting 18 thus may move slidably along the elongate pole 12 between an open position, as shown in FIG. 1, and a closed position wherein the ribs 22 and cover 10 are folded against the pole 12. A fitting latch or lock member 20 is provided to hold the umbrella cover 10 in the open position. When in the open position, the umbrella cover or hood extends over and covers the end post 16 and has a generally convex or inverted saucer shape. The umbrella cover 10 and rib 22 mechanism is a typical mechanism comprised of various ribs 22 and fabric 24, and may be moved between an open and closed position, the open position covering the end post 16.

The post 16 includes a buckle mechanism 26 attached to a ring 27. A leash 28 is attached to the buckle mechanism 26. The leash 28 is a flexible strap. The free or distal end of the leash or strap 28 includes a second buckle mechanism 30. The second buckle mechanism 30 may be attached to a collar (not shown) for an animal.

When walking a pet, such as a dog, for example, the strap or leash 28 may be attached to the collar of the animal and the umbrella cover 10 maintained in the open position, as depicted in FIG. 1. In this manner, the animal may be walked and protected from the elements.

It should be noted that the configuration of the umbrella 10 in the figure is a typical convex or spherical shape. However, multiple shapes may be utilized. Also importantly, the fabric 24 comprising the cover may include a slot 32 extending partially through the cover from an edge 34 upwardly toward the pole 12 in a radial direction. This will permit the strap 28 to fit through the slot 32 enabling the animal to take a lead position while remaining generally covered by the umbrella, but without having the strap 28 interfering with the umbrella.

Figure 2:
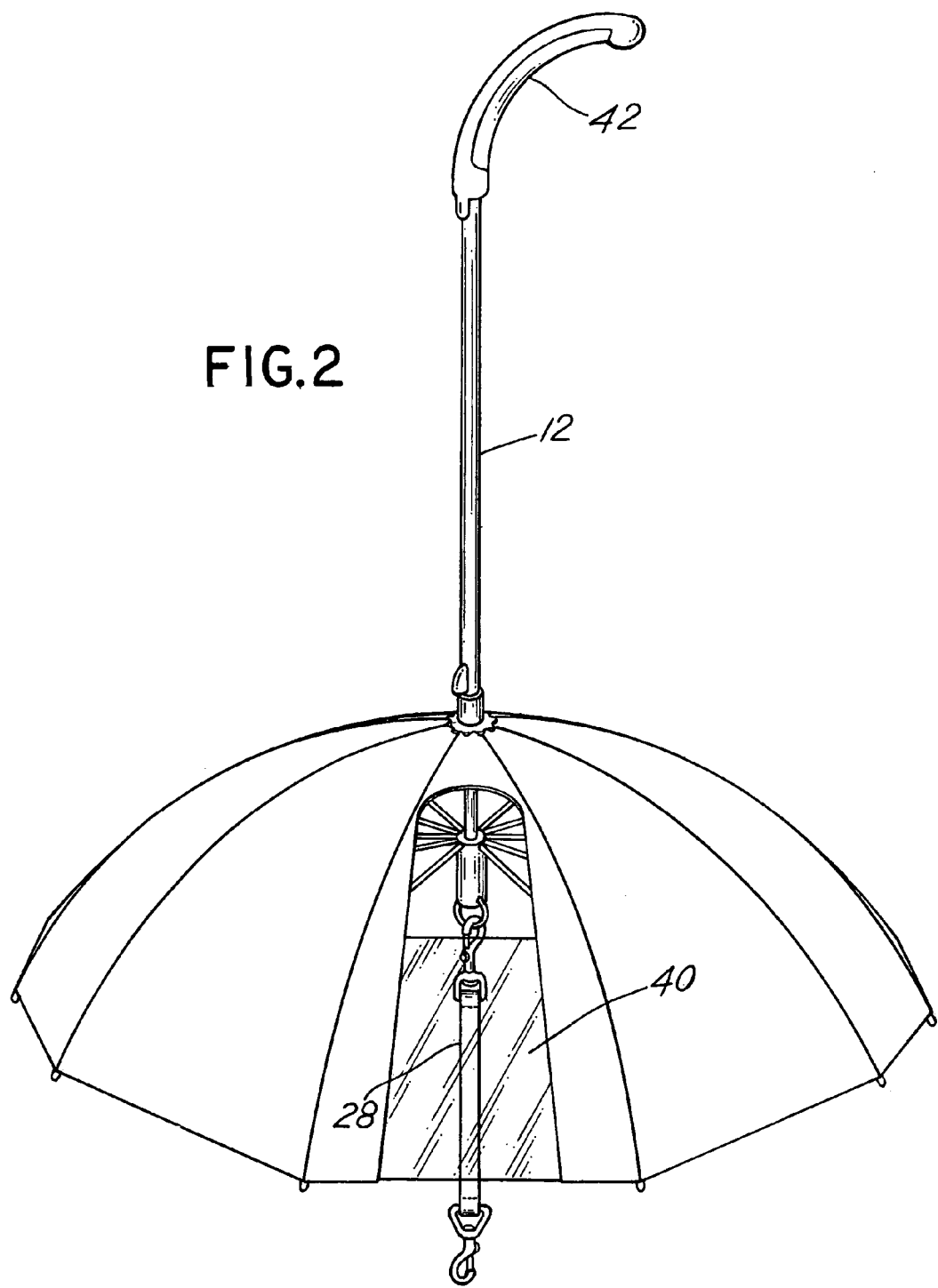
FIG. 2 is an isometric view of a second embodiment of the invention.
Figure 3:
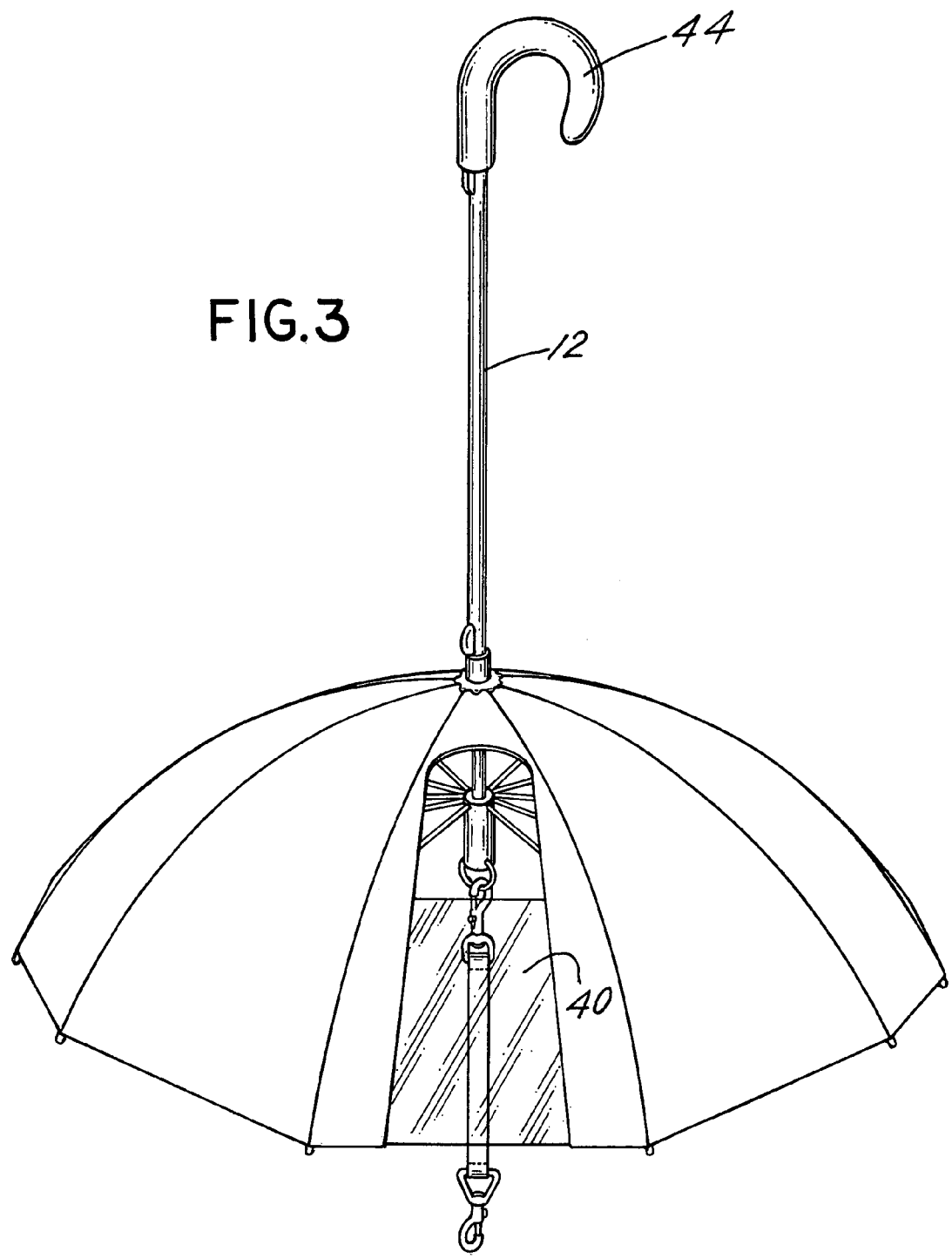
FIG. 3 is an isometric view of a third embodiment of the invention.

The aforesaid description relates in general to the structure depicted in FIG. 1. The structures of FIGS. 2 and 3 are somewhat different as described hereinafter. Referring therefore particularly to FIG. 2, there is disclosed an umbrella having a transparent radial panel 40 in lieu of a slit through the umbrella. Thus, the umbrella may be tilted for observation of the pet or animal attached to the strap or leash 28. Further, the handle 42 for the umbrella of FIG. 2 is arcuate or as shown in FIG. 3 is curved to provide an ergonomic feature for the umbrella making it easier to use, particularly when it is appropriate and necessary to hold the post of the umbrella at an angle with respect to the animal and the ground. FIG. 2 thus depicts a handle 42 which enables holding the umbrella at an angle in a more efficient and ergonomic manner. Similarly, the embodiment of FIG. 3 includes a transparent panel 40 and an ergonomic curved handle 44.

Figure 4:
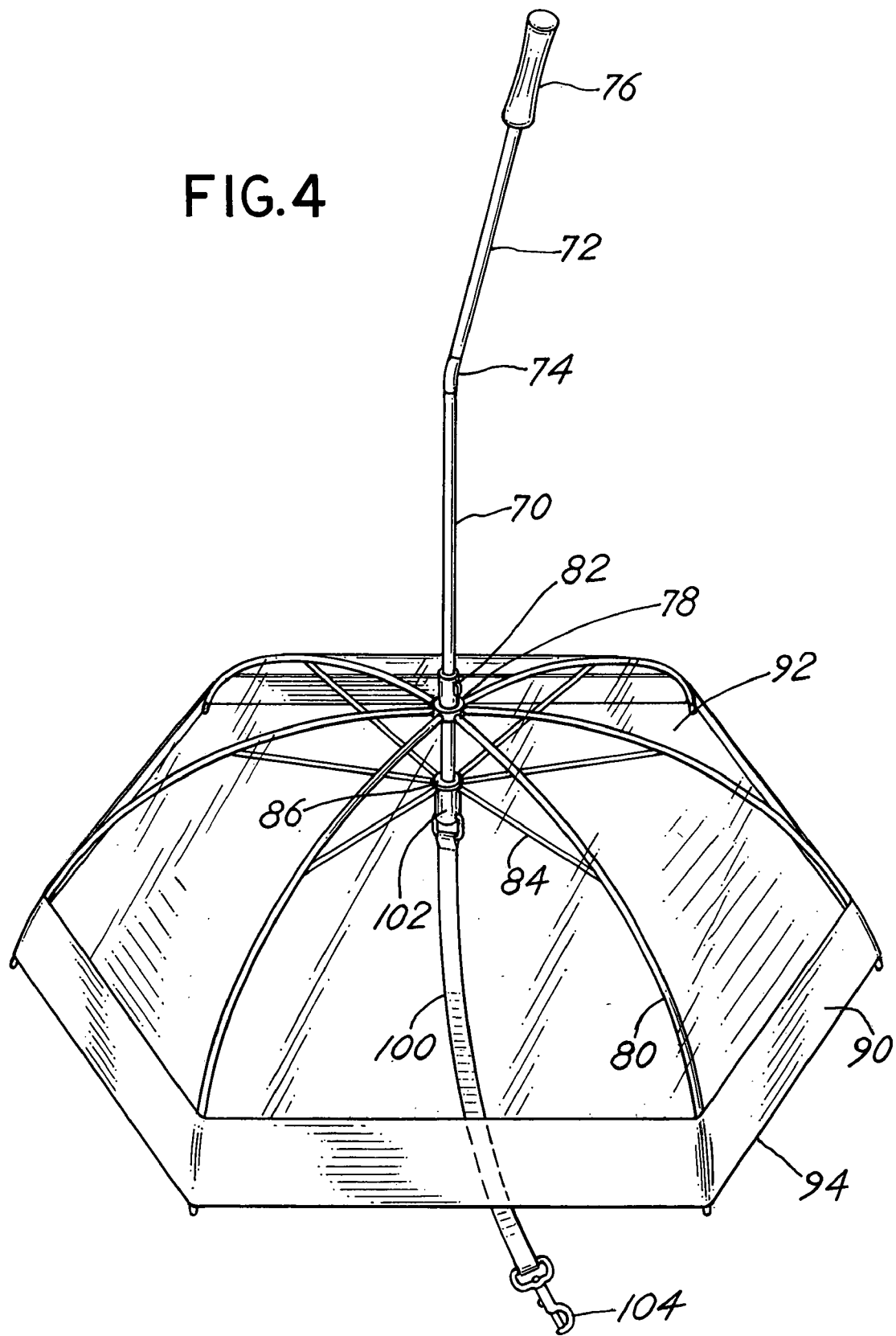
FIG. 4 is an isometric view of a fourth embodiment of the invention.

Referring to the alternative embodiment of FIG. 4, the combination leash and umbrella includes an elongate center main shaft 70 in the form of a narrow diameter tube. The main shaft 70 is connected to an extension shaft 72 by a flexible, articulating joint 74. Extension shaft 72 includes a handle 76 at its outer end.

The main shaft 70 includes an annular sliding ring 78 having a plurality of radiating ribs or splines 80 pivotally attached thereto. The ring 78 slides axially on shaft 70 carrying with it the inner end of splines or umbrella ribs 80. The ring 78 may be retained in the position by a spring latch 82 to thereby hold the umbrella in the open position as depicted in FIG. 4. Release of latch 82 enables folding of the umbrella upwardly to a closed position. Each rib or spline 80 is attached by a brace member 84 to a fixed ring 86 in a manner which enables pivoting of the splines 80 between the open and closed position.

The umbrella fabric or cover 90 is comprised of a transparent center section 92 and a perimeter 94 which is translucent or opaque. The cover 90 has a generally rectangular configuration or profile when in the open position to facilitate use of the umbrella with a pet and to enable the pet walker to walk beside the pet with the umbrella open. The embodiment of the invention thus enables covering a pet while at the same time walking at the side of the pet.

A leash 100 is attached to a buckle 102 at the distal end of shaft 70. Leash 100 is flexible and includes a clasp 104 at the end of leash 100 to affix to the collar of a pet.

It is to be noted that the buckle 102 is detachable from the leash of a pet. Further, it is to be noted that the leash 100 is attached to a buckle 102 at the distal end of the shaft, but may be removed by disengaging the buckle 102. Thus, the leash 100 may be detached and affixed to a leash without the umbrella so that the leash 100 may be incorporated as part of a collar for the animal or it may be separate yet utilized for attachment to a separate leash. The clasp 104 at the end of the leash 100 used to affix the leash 100 to the collar of a pet also enables the leash 100 to be used in a manner which will permit utilization of the combination leash and umbrella with any animal having a collar. The leash 100 is depicted as being preferably flexible. Additionally, the leash 100 may include or comprise an elastic member or a member which will enable extension of the leash for certain distance. That is, the umbrella can be placed in the folded condition and a leash 100 may include a feature enabling the leash to expand lengthwise. As a consequence, there are many alternative embodiments of the invention. The invention is therefore to be limited only by the following claims and equivalents thereof.

What is claimed is:

1. An umbrella and small animal leash comprising in combination:

a foldable umbrella having a center pole, said pole including a handle at one end and a post at the opposite end, said post including a post end, said umbrella further including a generally opaque foldable cover having a center and mounted on the center pole for opening convexly over said post to provide a generally partially spherical cover over the post; and a flexible animal leash attached to the post end, said foldable cover moveable between a closed position folded generally against the center pole and an open position extending over the post end and leash, said post including a latch at the juncture of the pole and post for holding the foldable cover in the open position intermediate the handle and the post end;

said umbrella foldable cover including a single open, radial slot extending from one edge substantially toward the center of the foldable cover to enable extension of the leash into the slot, said pole including an articulating joint intermediate the handle and the latch for enabling changing of the orientation of the pole with respect to the open foldable cover.

2. The combination of claim 1 further including:

a single transparent portion of said cover in said slot.

3. The combination of claim 1 including a removable buckle attaching the leash to the post end.

4. The combination of claim 1 including a removable buckle attached to an outer end of the leash.

5. An umbrella and small animal leash comprising in combination:

a foldable umbrella having a center pole, said pole including a handle at one end and a post at the opposite end, said post including a post end, said umbrella further including a foldable cover mounted on the center pole for opening convexly over said post;

a flexible animal leash attached to the post end, said foldable between a closed position folded about the center pole and an open position extending over the post end and leash, said umbrella fabric cover comprising a transparent cover;

said pole including a latch intermediate the post end and handle for holding the foldable cover in an open position over the post and leash; and said pole further including an articulating joint intermediate the handle and post for enabling change of the orientation of the pole with respect to the foldable cover.

\* \* \* \* \*